Dec. 10, 1935.   D. L. LAROSE   2,023,845
MOTOR VEHICLE REAR LAMP
Original Filed July 12, 1934   2 Sheets—Sheet 1
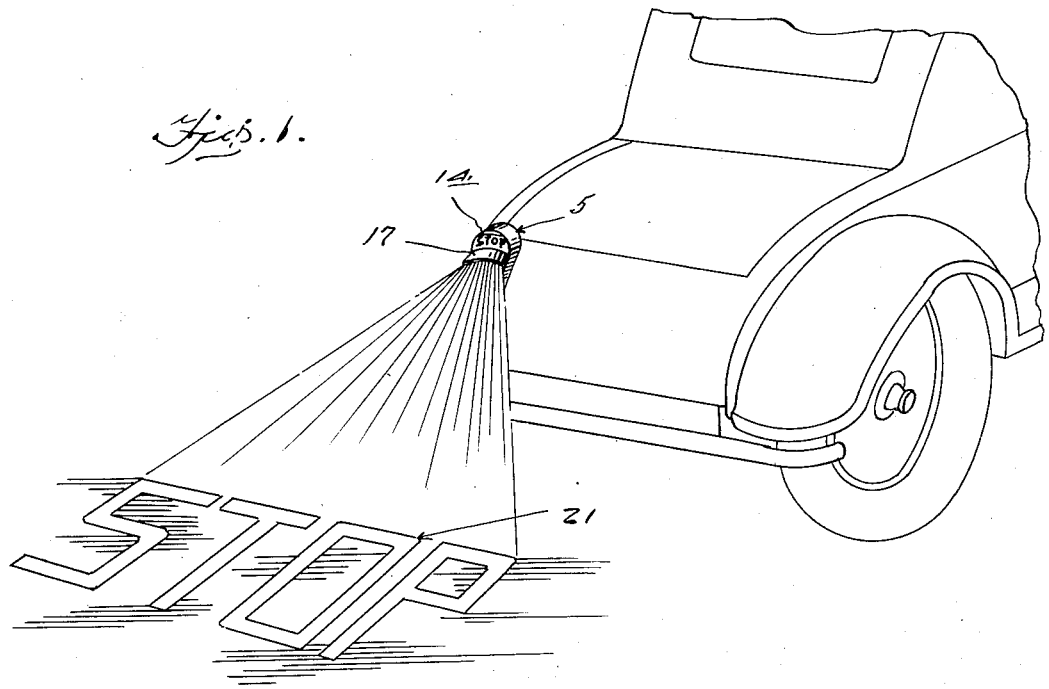
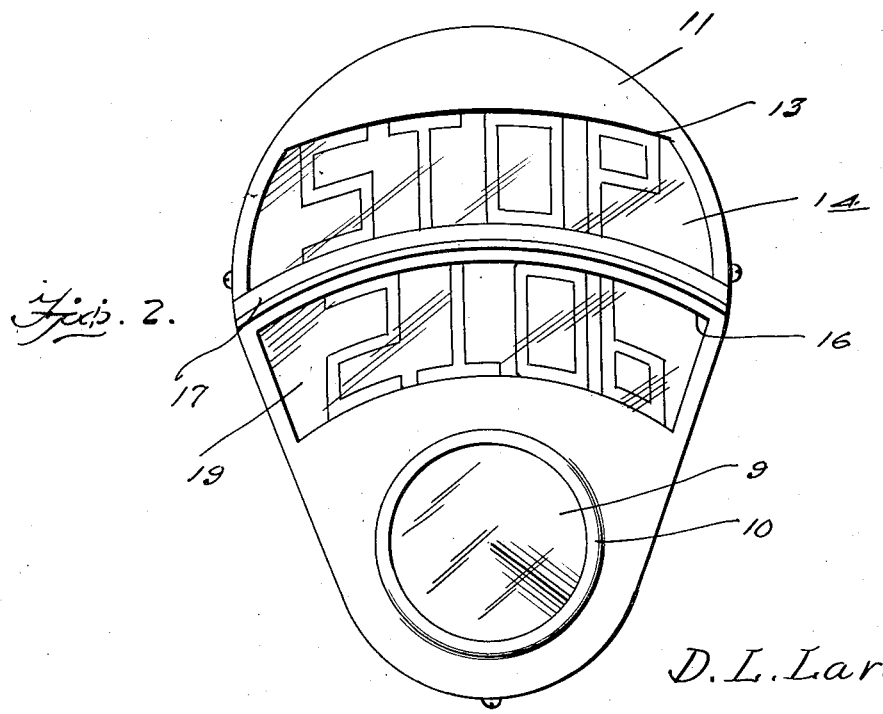
Inventor
*D. L. Larose*
By *Clarence A. O'Brien*
Attorney Dec. 10, 1935.  D. L. LAROSE  2,023,845

MOTOR VEHICLE REAR LAMP

Original Filed July 12, 1934   2 Sheets-Sheet 2

Inventor

D. L. Larose

By Clarence A. O'Brien
Attorney

Patented Dec. 10, 1935

2,023,845

UNITED STATES PATENT OFFICE 2,023,845

MOTOR VEHICLE REAR LAMP

Dantes L. Larose, Indian Orchard, Mass.

Continuation of application Serial No. 734,823, July 12, 1934. This application August 20, 1935, Serial No. 37,070

1 Claim. (Cl. 177—329)

This application is a continuation of application Serial Number 734,823, filed July 12, 1934, which has become abandoned.

This invention relates to that class of devices loosely referred to in the trade as tail-lights, and has more particular reference to a special rear lamp construction wherein the lamp serves as a tail-light for use in conjunction with the license tag, and further as a signal or stop light.

Needless to say, I am aware of the fact that it is now common in the trade to provide duplex lamp constructions wherein the stop light and tail-light are combined in one enclosure or casing. By way of contrast with the conventional constructions, the novelty of the present invention is predicated upon a similar construction which embodies, as an additional safety feature, means for projecting a beam of light rearwardly and downwardly against the road or surface which beam of light casts a shadow on the surface indicating the word "Stop".

Manifestly, the purpose of the invention is to provide a further safeguard in rear lamp structures by embodying therein this additional visible illuminated signaling or stop indicating feature calculated to promote safer driving in that the oncoming driver is warned not only by the regular red flash stop light but additionally notified by the safety projected beam.

Structurally visualized, the preferred embodiment of the invention is reduced to practice through the instrumentality of a simple double compartment lamp or bulb casing wherein the improved features are associated essentially with the upper compartment and which features consist essentially of an especially constructed cover plate having the requisite notification features.

Other features, advantages and objects will become more readily apparent from the following description and drawings.

In the drawings:—

Fig. 1 is a perspective view of the rear portion of a conventional automobile equipped with the improved rear lamp structure.

Fig. 2 is a rear end elevational view of the device per se.

Figure 3:
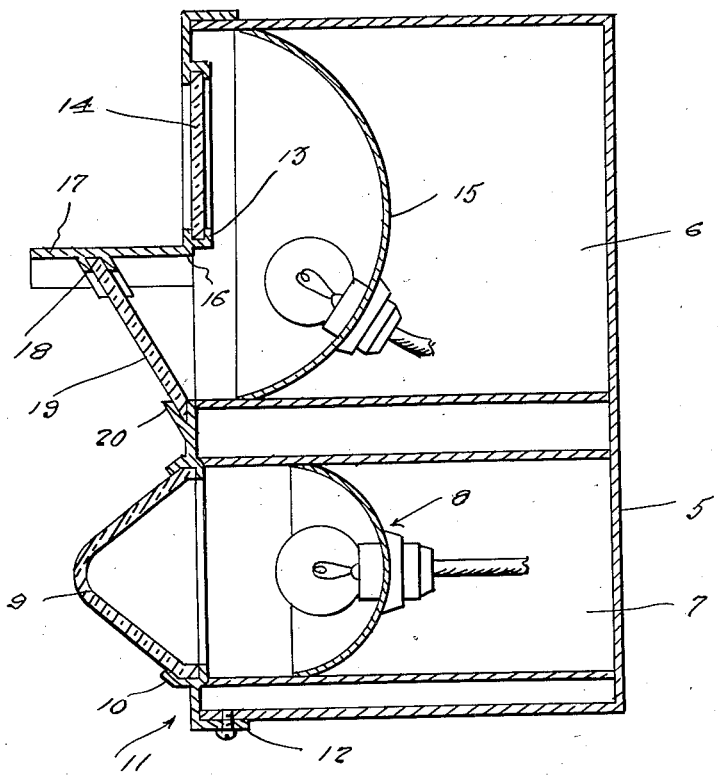
Fig. 3 is a vertical sectional view, partly in elevation, showing the allocation of parts more plainly.
Figure 4:
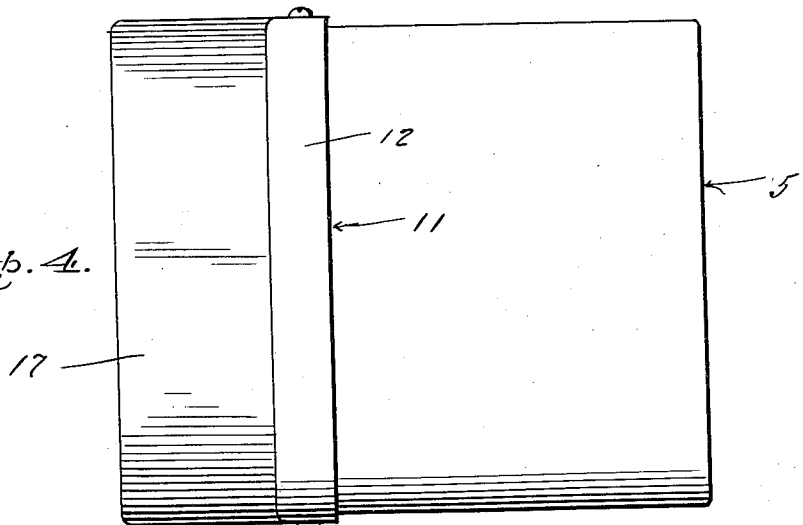
Fig. 4 is a top plan view of Fig. 2.

I invite attention first to Figs. 3 and 4, wherein it will be observed that the main casing which is of appropriate dimensions and materials, is denoted by the numeral 5. This is here shown as of vertically elongated form and divided by internal partitions of suitable shape and proportions into upper and lower compartments 6—7 respectively. The lower compartment is adapted to contain a reflector and an electric light bulb or lamp which may be described as an illuminating unit 8 and this is disposed inwardly and behind the conical red-colored lens 9 mounted in a suitable retaining rim 10 and forming the customary tail-light. The feature 10 forms an integral part of the removable cover plate 11 for the open side or face of the casing. This cover plate is provided with a marginal flange 12 which fits telescopically over the adjacent portion of the casing and serves to keep the parts assembled. The main refinement and feature of distinction of this cover plate is the fact that it is provided at its top with a sight or window having an internal retaining frame 13 for holding the glass panel 14 in place. This glass panel registers with the illuminating unit 15 mounted in the large or upper compartment 6. The unit 15 includes the customary parabolical reflector and associated bulb. As a matter of fact, this window and its glass panel serve as the customary stop light. That is to say, the glass is preferably red colored and includes the word "Stop" as shown in Fig. 2. Hence, I have, thus far, a double compartment casing with the tail-light and stop light as usual. It will be observed however that the stop light is supplemented by an additional safeguard in the form of an illuminated word projection beam. This is in the form of a sight opening 16 which is located just beneath the main stop light and which is also in registration with the source of light or unit 15. Projecting out beyond this sight opening 16 is a visor 17 which serves as a sort of hood and which is of appropriate shape and dimensions to correspond with the sight opening 16. On its under side, the visor 17 is provided with a holder 18 for the inclined glass panel 19. The lower edge of this panel is held in a suitable keeper 20 formed as an integral part of the cover plate 11. The main thing to be noted about this glass panel 19 is that it is preferably painted black and has painted thereon in a symmetrical manner the word "Stop". It is to be observed however, that the letters of the word are printed or painted in white up-side-down so that when the beam is projected rearwardly and downwardly as illustrated in Fig. 1, it literally throws the word "Stop" on the surface or roadway as indicated at 21. Hence, this is a safety signalling beam which operates in conjunction with the main stop light. As a matter of fact, this supplementary stop indicating means really becomes the primary means if and when the surface of the road is such as to adequately receive and reflect it. That is to say, when the road is such as to provide the requisite screen receptive effect, the word "Stop" appears in rather large letters on the surface and becomes a feature of attraction which the cautious and vigilant driver of the oncoming car can hardly miss. At any rate, it is believed that to augment the rear lamp construction by providing this extra safety word-projecting beam will obviously enhance the utility of the device as a whole.

As will be appreciated by comparison of Figures 2 and 3, the visor 17 extending outwardly on the upright wall of the casing not only serves to hold the upper edge of the panel 19 but also serves the important function of separating the beam of light passing through the panel 14 from the beam of light passing through the transparent portion of the panel 19 and downwardly for the purpose before described.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

I claim:—

The herein described automobile signal device consisting essentially of a casing having a cover plate, a reflector in the casing and forming with the casing and the cover plate a compartment, said cover plate having a sight opening in the upper portion thereof, a transparent panel in the sight opening and presented to the interior of said compartment, said panel having thereon the word "Stop", a visor extending outwardly from said cover plate and disposed immediately below said panel, a lens presented to the interior of said compartment and disposed below said visor and having its upper edge secured to the underside of said visor adjacent the outer edge of the visor and its lower secured to said casing at a point spaced below the underside of the visor and also spaced below said panel, said lens having thereon the word "Stop" in inverted position, and a single lamp bulb in said compartment for the illumination of said panel and said lens.

DANTES L. LAROSE.